(12) United States Patent
Lee

(10) Patent No.: US 6,341,939 B1
(45) Date of Patent: Jan. 29, 2002

(54) TANDEM COOLING TURBINE BLADE

(75) Inventor: Ching-Pang Lee, Cincinnati, OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/628,152

(22) Filed: Jul. 31, 2000

(51) Int. Cl.⁷ .................................................. F01D 5/18

(52) U.S. Cl. ..................... 416/97 R; 415/115

(58) Field of Search ............................ 416/97 R, 96 R, 416/95; 425/115, 116

(56) References Cited

U.S. PATENT DOCUMENTS 5,340,278 A    8/1994    Magowan
5,382,135 A    1/1995    Green

*Primary Examiner*—F. Daniel Lopez
*Assistant Examiner*—James M McAleenan
(74) *Attorney, Agent, or Firm*—Andrew C. Hess; William Scott Andes

(57) ABSTRACT

A turbine blade includes an integral airfoil, platform, shank, and dovetail, with a pair of holes in tandem extending through the platform and shank in series flow communication with an airflow channel inside the shank. Cooling air discharged through the tandem holes effects multiple, convection, impingement, and film cooling using the same air.

20 Claims, 3 Drawing Sheets

TANDEM COOLING TURBINE BLADE

BACKGROUND OF THE INVENTION

The present invention relates generally to gas turbine engines, and, more specifically, to turbine blade cooling thereof.

In a gas turbine engine, air is pressurized in a compressor and mixed with fuel in a combustor for generating hot combustion gases which flow downstream through turbine stages that extract energy therefrom for powering the compressor, and also typically powering a fan for producing propulsion thrust in an aircraft engine application. Each turbine stage includes a stationary turbine nozzle including a row of stator vanes extending radially between outer and inner bands which direct the combustion gases through a downstream row of turbine rotor blades extending radially outwardly from a supporting rotor disk.

The first stage turbine nozzle and blades are subject to the hottest temperature combustion gases discharged from the combustor and require effective cooling for ensuring a suitable useful life thereof. The vanes and blades therefore are hollow for channeling pressurized air bled from the compressor for internal cooling thereof. The vanes and blades typically include rows of inclined film cooling holes through the pressure and suction side surfaces thereof for forming a layer of protective film cooling air to insulate against the hot combustion gases flowing over the vane and blade airfoils.

Since air used in cooling turbine components bypasses the combustor, the overall efficiency of the engine is correspondingly reduced. Accordingly, it is desired to limit the amount of cooling air diverted from the compressor for minimizing the reduction in engine efficiency.

As combustion gas temperature is increased in developing more efficient gas turbine engines, the cooling requirements for the turbines further increase. For example, each turbine blade includes an integral platform at the root thereof which defines a portion of the inner flowpath boundary for the combustion gases. The platforms are typically imperforate and are cooled from their undersides by air channeled in corresponding cavities therebelow.

To further increase platform cooling, the platform may include film cooling holes extending therethrough for film cooling the outer surfaces thereof directly exposed to the hot combustion gases, with the inner surfaces thereof being convection cooled by cooling air circulating within the under platform cavities.

However, film cooling is limited in effectiveness, and the introduction of film cooling holes in the platform of a rotor blade should avoid undesirable stress concentrations which would locally increase stress during operation and correspondingly reduce the useful life of the rotor blades.

Accordingly, it is desired to provide a gas turbine engine turbine blade having improved platform cooling.

BRIEF SUMMARY OF THE INVENTION

A turbine blade includes an integral airfoil, platform, shank, and dovetail, with a pair of holes in tandem extending through the platform and shank in series flow communication with an airflow channel inside the shank. Cooling air discharged through the tandem holes effects multiple, convection, impingement, and film cooling using the same air.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
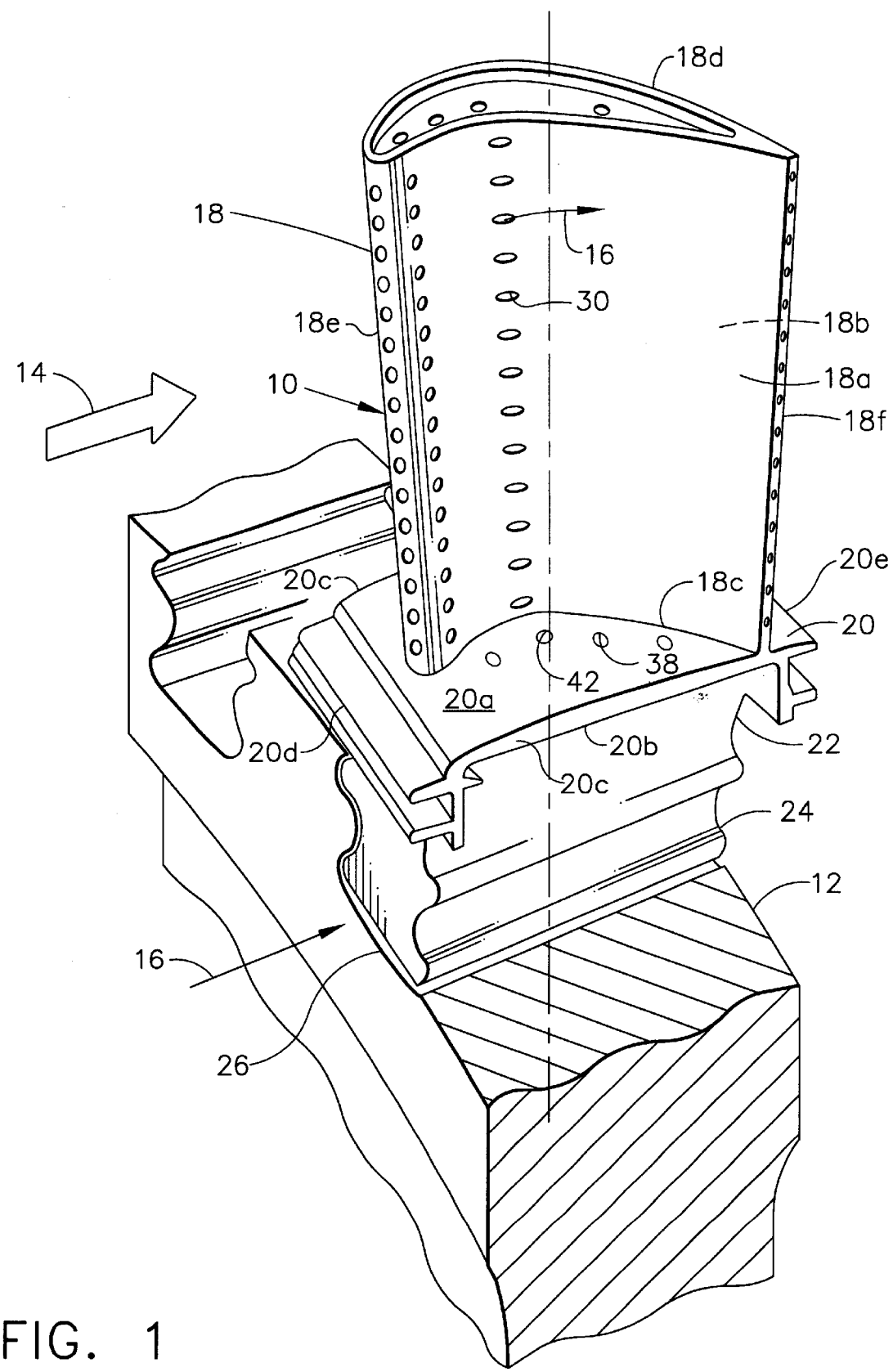
FIG. 1 is a partly sectional, isometric view of an exemplary gas turbine engine turbine rotor blade mounted to the perimeter of a supporting rotor disk, shown in part.

Illustrated in FIG. 1 is an exemplary turbine rotor blade 10 extending radially outwardly from the perimeter of a turbine rotor disk 12, shown in part. The turbine blade is configured for use in the first turbine stage of a gas turbine engine in which a full row of the blades is disposed directly downstream from a cooperating high pressure turbine nozzle (not shown) which directs hot combustion gases 14 over the turbine blades which extract energy therefrom for rotating the disk and powering a compressor (not shown).

The compressor (not shown) pressurizes air 16, a portion of which is diverted to the turbine blades which are hollow for internal cooling thereof. Most of the pressurized air is mixed with fuel in a combustor (not shown) for generating the hot combustion gases 14 which flow over the turbine blades during operation.

Each blade 10 is typically a unitary casting of high strength metal suitable for withstanding the high temperature of the combustion gases during operation. Each blade includes an airfoil 18, platform 20, shank 22, and dovetail 24 having any conventional integral configuration.

The airfoil 18 includes a generally concave pressure side 18$a$ and an opposite, generally convex suction side 18$b$ extending radially in span from a root 18$c$ to a tip 18$d$ and axially between leading and trailing edges 18$e,f$.

The platform 20 includes a radially outer surface 20$a$ which defines a portion of the inner boundary for the hot combustion gases 14, and an opposite, radially inner surface 20$b$. The platform surfaces extend circumferentially from opposite side edges 20$c$, and axially between leading and trailing edges 20$d,e$.

Figures 2, 3:
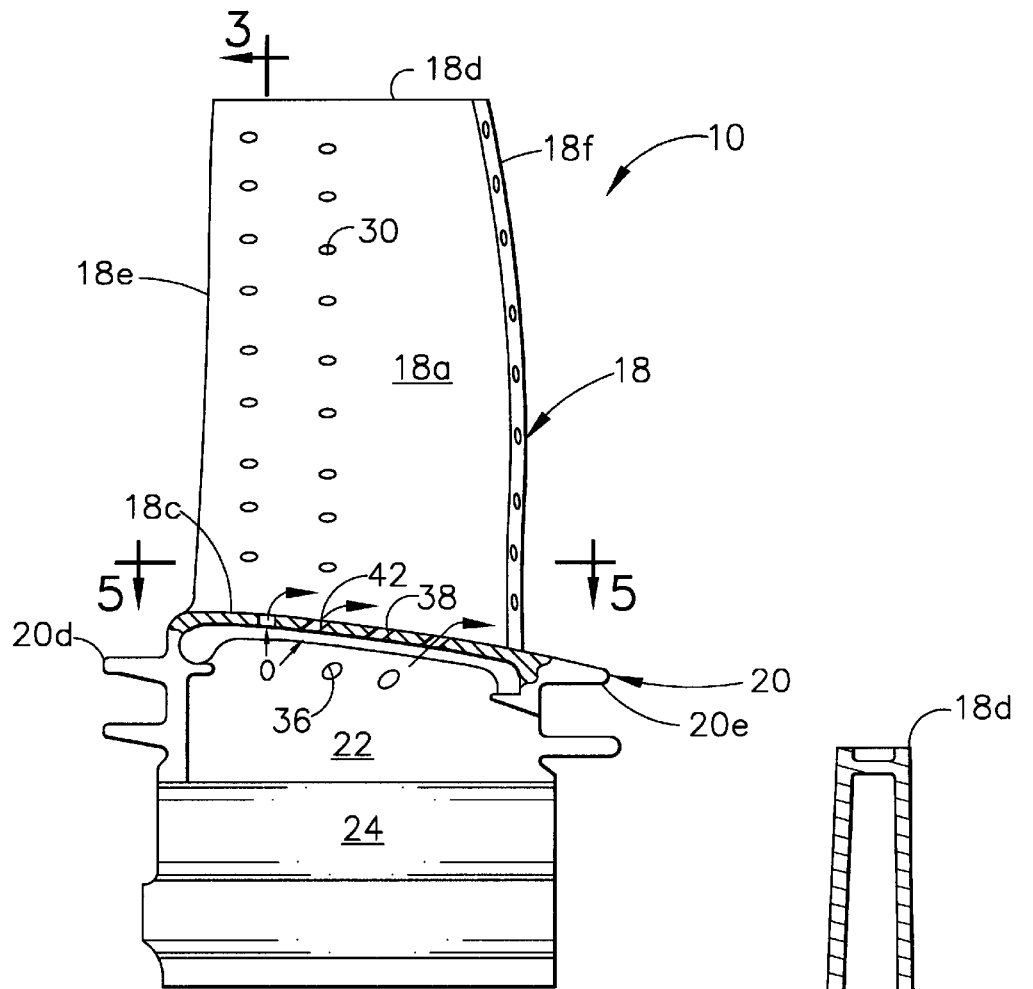
FIG. 2 is a side elevational view of the turbine blade illustrated in FIG. 1, with the platform thereof being shown in section for illustrating tandem cooling holes in accordance with a preferred embodiment of the present invention.
FIG. 3 is a radial sectional view through the turbine blade illustrated in FIG. 2 and taken generally along line 3—3.

The shank 22, which is better illustrated in FIG. 2, provides a radial transition from the platform to the supporting dovetail 24.

The dovetail 24 as illustrated in FIG. 1, may have any conventional configuration and typically includes one or more pairs of serpentine lobes which extend axially for engaging corresponding axial-entry dovetail slots 26 formed in the perimeter of the rotor disk.

As shown in FIG. 3, the turbine blade is hollow with a flow channel 28 extending radially or longitudinally along the span thereof, with an inlet at the bottom of the dovetail 24 and terminating at the airfoil tip 18$d$. The flow channel 28 may have any conventional configuration and typically includes multiple serpentine passes for circulating the cooling air 16 inside the airfoil for internally cooling the airfoil for removing heat therefrom when exposed to the hot combustion gases flowing outside thereof.

As shown in FIGS. 1 and 2, the airfoil includes various holes 30 extending through the walls thereof for discharging the cooling air into the combustion gas stream. The airfoil holes 30 may have any conventional form such as film cooling holes which are disposed in radial rows for generating insulating films of cooling air.

As initially illustrated in FIG. 1, the platform 20 extends laterally outwardly both circumferentially and axially from both the airfoil and shank at a corresponding junction therewith. As shown in more detail in FIG. 4, the shank 22 adjoins the inner surface of the platform at an arcuate inner fillet 32, and the airfoil adjoins the outer surface of the platform at an arcuate outer fillet 34. The fillets provide an aerodynamically smooth junction between the platform and the airfoil, and minimize stress concentrations under the considerable centrifugal loads generated during rotary operation of the blades.

In accordance with the present invention, a pair of discrete shank and platform holes 36,38 are disposed in tandem through the shank 22 and platform 20, respectively.

The shank hole 36 includes an inlet 36a inside the shank in flow communication with the flow channel 28, and an outlet 36b outside the shank for discharging a jet of the cooling air 16 therethrough.

The cooperating platform hole 38 includes an inlet 38a disposed below the platform on the inner surface 20b thereof in alignment with the shank outlet hole. The platform hole also includes an outlet 38b disposed above the platform on the outer surface 20a thereof.

The tandem shank and platform holes 36,38 cooperate as a pair for improving cooling of the platform 20 subject to the hot combustion gases on its outer surface 20a. The shank hole 36 first receives a portion of the cooling air from the internal flow channel 28 which is discharged from the shank hole outlet 36b toward the platform hole inlet 38a. The shank hole 36 is spaced from the inner surface of the platform by an under platform cavity 40 in which additional cooling air may be channeled in a conventional manner. Correspondingly, the platform hole 38 is spaced above the shank 22 and receives its cooling air from its cooperating shank hole after bridging or traversing the respective portion of the cavity 40.

Figure 4:
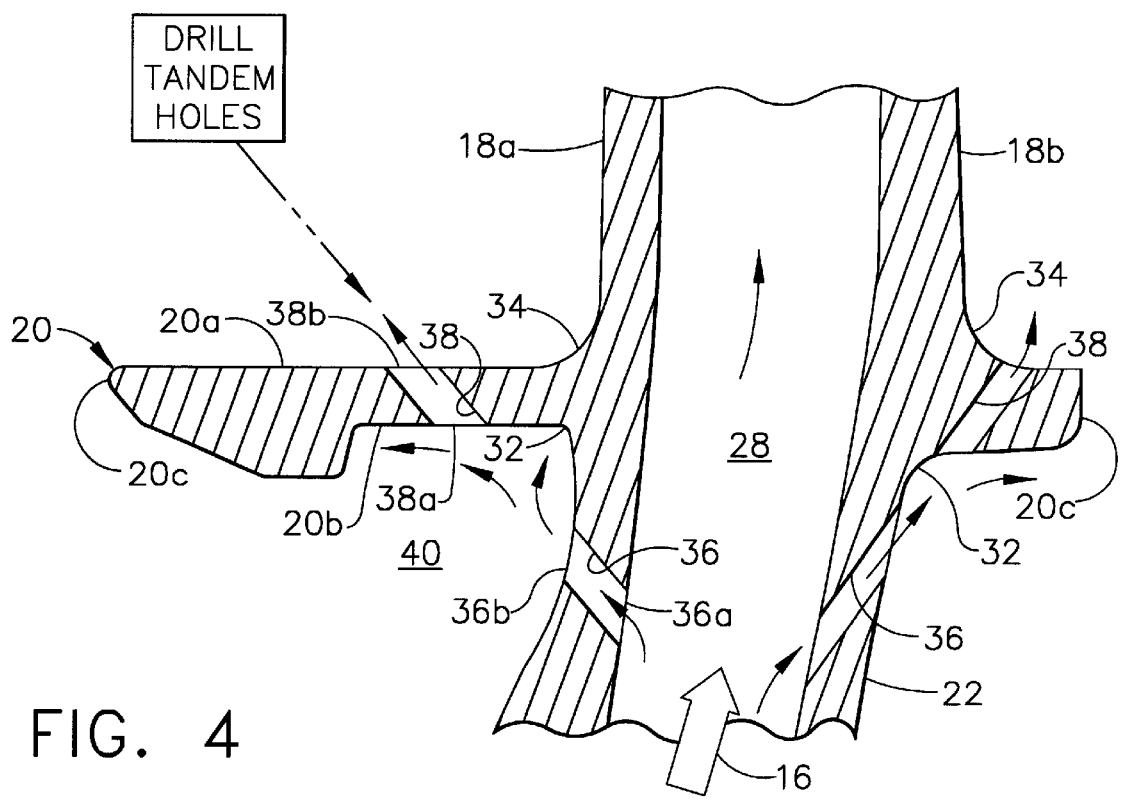
FIG. 4 is an enlarged, sectional, elevational view of a portion of the turbine blade illustrated in FIG. 3 including exemplary pairs of the tandem holes extending in series between the blade shank and platform.

In the exemplary embodiment illustrated in FIG. 4, the tandem holes 36,38 extend separately through the shank and platform in series flow communication with the flow channel 28 inside the shank. The tandem holes are preferably inclined in series for bridging the cavity 40 and distributing the cooling air from the shank hole 36 both inside the cooperating platform hole 38, as well as outside thereof in impingement against the inner surface of the platform around the inlet of the platform hole.

The shank hole discharges a local jet of cooling air toward the cooperating platform hole to feed the inside of that hole as well as effecting local impingement cooling therearound. In this way, the cooling air received from the flow channel 28 firstly is used to convectively cool the inside of the shank hole 36, and then impingement cools the underside of the platform, and then convectively cools the inside of the platform hole 38, and then is discharged from the inclined platform hole to form a film of cooling air for providing yet additional use of the same air in synergistic series cooling. The same air is thusly used multiple times for maximizing the cooling efficiency thereof prior to rejoining the combustion flowpath.

Figure 5:
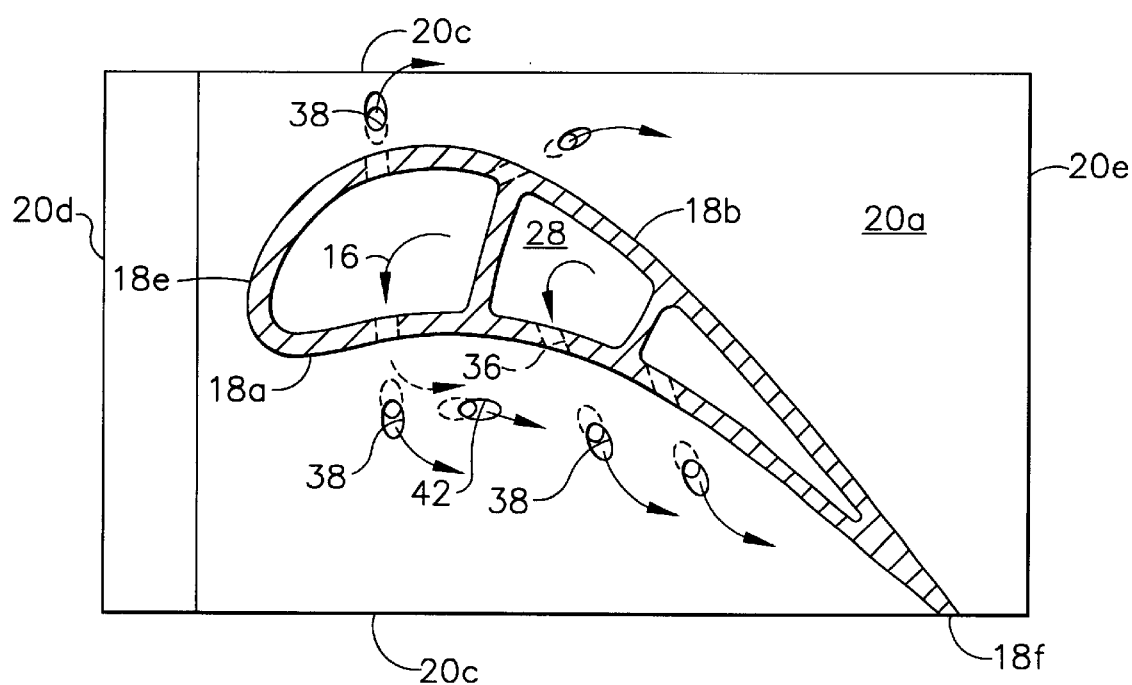
FIG. 5 is a top, partly sectional view of the turbine blade illustrated in FIG. 2 and taken along line 5—5.

As shown in FIGS. 4 and 5, the tandem holes 36,38 are preferably inclined in part outwardly through the platform toward corresponding ones of the platform side edges 20c, and inclined outwardly in part through the platform aft or downstream toward the platform trailing edge 20e in a compound inclination. In this way, the cooling air discharged from the platform hole 38 creates a cooling air film downstream therefrom for protecting the outer surface of the platform.

Furthermore, the shank hole 36 illustrated in FIG. 4 preferably terminates radially inboard of the inner fillet 32 so that the two tandem holes 36,38 are spaced radially and circumferentially apart at the inner fillet 32 while being aligned in series flow communication for bridging the platform and shank across the inner fillet with air discharged from the flow channel. In this way, the jet of air discharged from the shank hole 36 partially expands in the cavity 40 for impingement cooling the underside of the platform around the cooperating platform hole 38, with a central portion of the jet being injected through the platform hole 38 for flow therethrough.

The tandem holes 36,38 are preferably coaxially aligned with each other in a straight and inclined line for ensuring a straight flowpath for channeling at least some of the air ejected form the shank hole 36 into the cooperating platform hole 38.

In one embodiment illustrated on the left side of FIG. 4, the tandem holes 36,38 have substantially equal diameters. In particular, the platform hole inlet 38a is substantially equal in size with the shank hole outlet 36b for receiving the jet of cooling air therefrom, with some of that jet impinging the underside of the platform around the platform hole.

In another embodiment illustrated on the right side of FIG. 4, the platform hole 38 is larger in diameter than the cooperating shank hole 36. The platform hole inlet in this embodiment is suitably larger in size than the shank hole outlet. An additional advantage of the larger diameter platform hole is that additional diffusion of the cooling air jet discharged from the cooperating smaller shank hole 36 is obtained for reducing the discharge velocity of the air from the larger platform hole and effecting film cooling atop the platform with a correspondingly lower blow-off ratio.

In both embodiments, the diameters of each of the shank and platform holes is substantially equal or constant from the respective inlet to outlet ends thereof.

As illustrated in FIGS. 1,2,and 5, the platform 20 preferably includes a plurality of the tandem holes 36,38 arranged in a row terminating in the platform outer surface along at least one side of the airfoil, such as the pressure side 18a. The tandem holes are spaced apart axially between the leading and trailing edges of the platform for distributing their improved cooling effectiveness across the platform.

As shown in FIGS. 4 and 5, another row of the tandem holes 36,38 may be disposed along the opposite, suction side of the airfoil preferably near the leading edge thereof for cooling this region of the platform.

The tandem holes 36,38 described above effect multiple use of the same air for enhanced cooling of the platform. And, the tandem holes are spaced inboard from the inner fillets 32 and do not introduce any stress concentrations at the juncture of the platform and airfoil.

The tandem holes may be used in cooperation with an auxiliary film cooling hole 42 shown in FIGS. 2 and 5 which is preferably inclined aft through the platform, and preferably aft of one of the platform holes 38 for receiving spent impingement cooling air from the underside of the platform.

In this way, additional film cooling holes 42, without cooperating tandem shank holes therefor, may be fed with cooling air discharged from the adjacent shank holes 36. The air discharged from the several shank holes 36 also film cools the underside of the platform prior to being discharged through any one of the platform or auxiliary holes 38,42.

As shown in FIG. 5, the platform and auxiliary holes 38,42 are preferably aligned in a row along one side, such as the pressure side of the airfoil for maximizing cooling air coverage in this region.

The tandem holes described above may be used alone to significant advantage in improving cooling of the blade platform with an efficient use of the available air. And may be additionally used with the auxiliary film cooling holes for providing additional cooling.

As shown schematically in FIG. 4, the tandem holes 36,38 in their preferred coaxial alignment may be readily formed by conventionally drilling the holes in sequence from outside the platform inwardly through the shank. The same drilling process, such as laser drilling or electrical discharge machining, may be used for drilling the common diameter holes through both the platform and shank.

Alternatively, for the larger platform holes illustrated in the right of FIG. 4, a two step drilling process may be used to initially drill the smaller shank hole 36 with a common diameter through both the platform and shank, followed in turn by a second drilling operation for increasing the diameter of only the cooperating platform hole 38. Or, the larger platform hole 38 may be initially drilled alone without drilling the shank hole, followed in turn by drilling the smaller shank hole 36 in the shank through the pre-drilled platform hole.

Although the tandem holes may be formed with generally cylindrical form, any other shape of the holes may be used to advantage. The tandem holes may be used to advantage for cooling turbine blade platforms when required for high temperature turbine applications.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by letters patent of the united states is the invention as defined and differentiated in the following claims in which I claim:

1. A turbine blade comprising:
   an integral airfoil, shank, and dovetail having a longitudinal flow channel extending therethrough for channeling cooling air;
   a platform extending laterally outwardly at a junction of said airfoil and shank;
   a shank hole extending through said shank from said flow channel and spaced from said platform; and
   a platform hole extending through said platform in tandem alignment with said shank hole.

2. A blade according to claim 1 wherein said shank and platform holes are inclined in series through said shank and platform for distributing said cooling air from said shank hole to said platform hole, both inside said platform hole and outside thereof in impingement against said platform.

3. A blade according to claim 2 wherein said platform includes opposite side edges 20c and leading and trailing edges, and said tandem shank and platform holes are inclined outwardly aft toward said platform trailing edge.

4. A blade according to claim 3 wherein said shank adjoins said platform at a fillet, and said shank hole terminates inboard of said fillet.

5. A blade according to claim 3 wherein said tandem holes have substantially equal diameters.

6. A blade according to claim 3 wherein said platform hole is larger in diameter than said shank hole.

7. A blade according to claim 3 further comprising a plurality of said tandem holes extending through said shank and platform and spaced apart between said platform leading and trailing edges.

8. A blade according to claim 7 further comprising an auxiliary hole inclined through said platform aft of one of said platform holes for receiving cooling air from the tandem shank hole corresponding therewith for film cooling said platform.

9. A blade according to claim 8 wherein said platform and auxiliary holes are aligned in a row along a side of said airfoil.

10. A blade according to claim 3 wherein said tandem holes are coaxially aligned.

11. A turbine blade comprising an integral airfoil, platform, shank, and dovetail, with a pair of holes in tandem extending separately through said platform and shank in series flow communication with an airflow channel inside said shank.

12. A blade according to claim 11 wherein said shank adjoins said platform at a fillet, and said tandem holes are spaced apart at said fillet and aligned in series for bridging said platform and shank across said fillet with air from said channel.

13. A blade according to claim 12 wherein said tandem holes include a shank hole extending through said shank spaced from a cooperating platform hole extending through said platform.

14. A blade according to claim 13 wherein:
   said shank hole includes an inlet inside said shank, and an outlet outside said shank; and
   said platform hole includes an inlet below said platform aligned with said shank hole outlet and an outlet above said platform.

15. A blade according to claim 14 wherein said tandem holes are coaxially aligned.

16. A blade according to claim 15 wherein said platform includes opposite side edges and leading and trailing edges, and said tandem holes are inclined in part outwardly aft toward said platform trailing edge, and in part outwardly toward one of said platform side edges.

17. A blade according to claim 16 wherein said platform hole inlet is substantially equal in size with said shank hole outlet.

18. A blade according to claim 16 wherein said platform hole inlet is larger in size than said shank hole outlet.

19. A blade according to claim 16 further comprising a row of said tandem holes terminating in said platform along one side of said airfoil.

20. A blade according to claim 19 further comprising another row of said tandem holes terminating in said platform along an opposite side of said airfoil.

* * * * *